March 31, 1953 L. S. HUTSON 2,633,528

ELECTRONIC PULSE MODULATOR SWITCH

Filed April 3, 1950

INVENTOR.
LEROY S. HUTSON
BY Harry M. Saragovitz
ATTORNEY.

Patented Mar. 31, 1953

2,633,528

UNITED STATES PATENT OFFICE 2,633,528

ELECTRONIC PULSE MODULATOR SWITCH

Leroy S. Hutson, Bronx, N. Y., assignor to the United States of America as represented by the Secretary of the Army Application April 3, 1950, Serial No. 153,685

1 Claim. (Cl. 250—27)

(Granted under Title 35, U. S. Code (1952), sec. 266)

The invention described herein may be manufactured and used by or for the Government for governmental purposes, without the payment of any royalty thereon.

This invention relates to electronic switches and more particularly to electronic pulse modulator switches for use in pulse modulating a transmitter at high repetition rates.

It is an object of this invention to provide an improved electronic switching system capable of instantaneously switching from a relatively high power positive pulse to a low negative pulse, and capable of being controlled by an ordinary high impedance voltage pulse source, which voltage source can then modulate a relatively low impedance source, thereby realizing a power gain.

The novel features which are considered to be characteristic of the invention are set forth with particularity in the appended claims. The invention itself, however, with further objects and advantages thereof, may best be understood by reference to the following description taken in connection with the accompanying drawing, wherein Fig. 1 is a schematic circuit diagram of one form of the invention; and Fig. 2 is a schematic circuit diagram of another form of the invention.

It is frequently desirable to pulse modulate the screen grid of the modulator power amplifier tube of a standard transmitter by means of an auxiliary pulsing system to provide an interrogator in order that forward stations may be interrogated by a pulse signal of a predetermined duration and frequency. In such a pulsing system, it is necessary to have sufficient power to pulse modulate the modulator screen grid in the pulse interval and to impress a sufficiently large negative voltage on the screen grid in the interpulse interval to cut off the modulator. It is an object of this invention to accomplish this result by means of a novel electronic switch to be used in the auxiliary pulsing system. While the novel switch is described as used in an auxiliary unit for a transmitter, it is not intended to be limited to such use.

Figure 1:
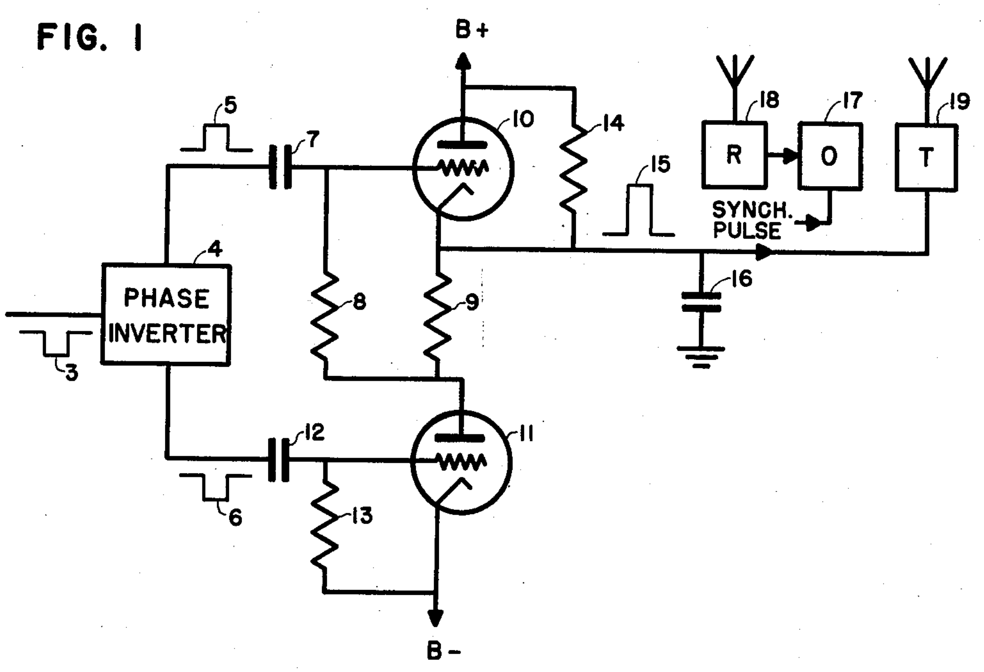
Figure 2:
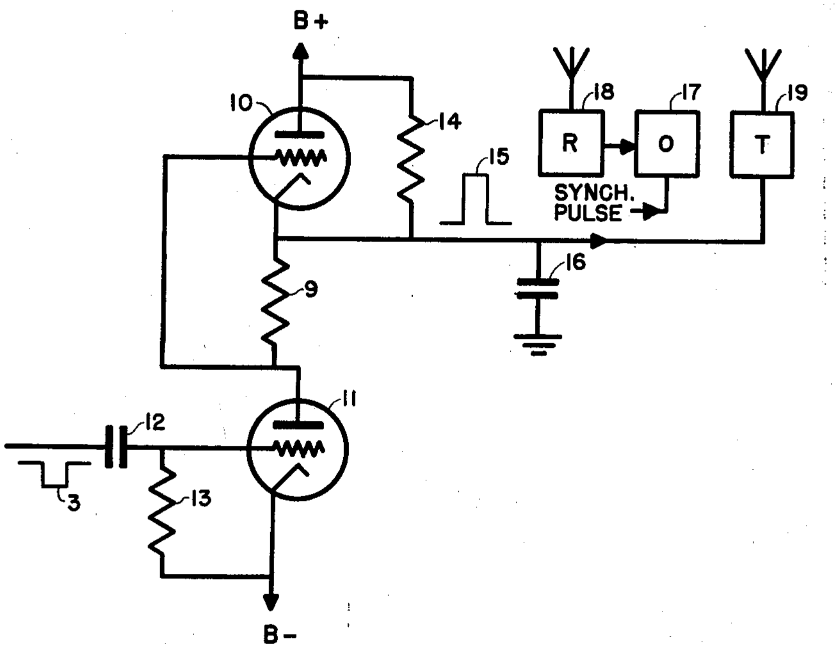

In Fig. 1 the numeral 3 indicates a negative pulse of determined duration and pulse frequency which is fed into a phase inverter 4. The phase inverter 4 delivers two simultaneous pulses 5 and 6 of opposite voltage and of the same duration and pulse frequency as pulse 3. Pulse 5 is impressed upon the control grid of triode tube 10 through the coupling capacitor 7. Pulse 6 is impressed upon the control grid of triode tube 11 through the coupling capacitor 12. The triodes 10 and 11 are connected in series, with the cathode of tube 10 connected through a small value resistor 9 to the anode of tube 11. The anode of triode 10 is connected directly to a source of positive operating potential B+. The cathode of triode 11 is connected to a source of negative operating potential B—. A resistor 14 of a relatively large value connects the anode and cathode of tube 10. A grid resistor 8 is connected between the control grid of 10 and the anode of 11. A grid resistor 13 is connected between the control grid and cathode of tube 11. A radio frequency by-passing capacitor 16 is connected from the cathode of tube 10 to ground. The output pulse 15 which is of the same pulse duration and frequency as pulses 3, 5, and 6 is obtained at the cathode of tube 10 and is impressed upon the screen grid of the modulator power amplifier tube of a transmitter 19. Numeral 17 represents a range oscilloscope into which a pulse synchronized with pulse 3 is fed. A standard receiver 18 receives answering pulses from the interrogated forward station and these are fed into the range oscilloscope 17 for determining the range of the forward station.

The exact values of the circuit constants will depend upon the duration of the modulating pulse 3, its shape, repetition rate, tube characteristics of tubes 10 and 11, value of B+ and B—, and the triggering and cut off potential of the modulator tube.

A second form of the present invention is shown in Fig. 2 which is in many respects similar to the arrangement shown in Fig. 1, except that in Fig. 2 the input pulse 3 is impressed directly upon the control grid of triode 11 through the coupling capacitor 12, and the control grid of triode 10 is connected directly to the anode of triode 11. Resistors 9, 13 and 14 and capacitor 16 are connected in the same manner as in Fig. 1. Output pulse 15 is impressed upon the screen grid of the modulator power amplifier tube of the transmitter 19.

In the operation of the circuit described in Fig. 1, the negative input pulse 3 of a predetermined pulse duration and frequency is fed into a phase inverter 4 of conventional design. Input pulse 3 is the output of a conventional pulse generator such as a phantastron. Phase inverter 4 converts pulse 3 into two simultaneous pulses 5 and 6 whose leading and trailing edges coincide, and one of which pulses is positive and the other negative. In the pulse interval, the positive pulse 5 and the negative pulse 6 from the phase inverter 4 are impessed upon ther contol grids of tubes 10 and 11 respectively. In order to trigger the modulator 19, it is necessary to apply a positive potential to the screen grid of the modulator power amplifier tube. This requires that there be a positive potential 15 on the cathode of tube 10 in the pulse interval. To accomplish this, tube 11 will have to be at cutoff while tube 10 is conducting, so that the positive potential B+ on the anode of tube 10 less the drop in potential across tube 10 will be applied to the cathode of tube 10. Tube 11 must be at cutoff in order that there will be complete isolation of the negative source of potential B—. In the pulse interval, a positive pulse 5 is impressed upon the control grid of tube 10 and a negative pulse 6 of coincident trailing and leading edges, upon the control grid of tube 11. Negative pulse 6 biases tube 11 to cutoff, thus isolating B—. Positive pulse 5 causes tube 10 to conduct, thereby effectively shunting the current around the by-passing resistor 14 through the tube 10, which now acts as a low impedance. This places B+ less the relatively small drop in potential across tube 10 on the cathode of tube 10, and thus on the screen grid of the modulator power amplifier tube. The screen grid of the modulator tube is now made sufficiently positive to enable this tube to conduct; that is, the modulator is triggered.

In the interpulse interval when no pulse is applied to the control grids of tubes 10 and 11, a sufficiently large negative potential must be applied to the screen grid of the modulator tube to cut off the modulator tube. At no signal on tube 11, tube 11 is conducting and is thus a low impedance. On the anode of tube 11, therefore, there is a negative potential equal to B— less the drop in potential across tube 11. This negative potential is applied to the control grid of tube 10 through grid bias resistor 8, thereby biasing tube 10 to cutoff. Tube 10, therefore, acts as an open circuit and by-passing resistor 14 effectively serves to isolate B+ from the cathode of tube 10. Hence, the negative potential on the anode of tube 11 less the potential drop across resistor 9 is applied to the cathode of tube 10. This negative potential on the cathode of tube 10 being applied to the screen grid of the modulator power amplifier tube, biases this tube to cutoff. By a suitable selection of circuit elements, any desired negative potential can be applied to the screen grid of the modulator tube.

The operation of the modification of my invention shown in Fig. 2 is similar to that of the circuit in Fig. 1 described above. In the modified form there is no need for a phase inverter because the negative pulse from the pulse generator is impressed directly upon the control grid of tube 11. This negative voltage on the control grid of tube 11 increases the tube bias, thereby increasing the impedance and decreasing the current flow through tube 11. There is thus a decrease in current through resistor 9 causing the potential drop across resistor 9 to decrease also. The result is that the bias of tube 10 decreases, the tube impedance decreases, and the current through the tube increases. With tube 11 at cutoff or near cutoff potential, B— is isolated from the cathode of tube 10 and since tube 10 is now conducting, B+, less the drop in potential across tube 10, is applied to the cathode of tube 10, and by-pass resistor 14 is effectively shunted out. This positive potential 15 on the cathode of tube 10 is impressed upon the screen grid of the modulator power amplifier tube, thereby causing this tube to conduct.

In the interpulse interval, no pulse is impressed upon the control grid of tube 11. The bias on tube 11 therefore decreases, the tube impedance decreases and the current through the tube increases. There is thus an increase of current through resistor 9; hence, the potential drop across resistor 9 increases also. The result is that the bias of tube 10 increases, the tube impedance increases and the tube current decreases. Tube 10 therefore acts as an effective open circuit and by-passing resistor 14 serves to isolate B+ from the cathode of tube 10. Hence, as in the circuit of Fig. 1, the negative potential on the anode of tube 11 less the drop in potential across resistor 9 is applied to the cathode of tube 10. This negative potential on the cathode of tube 10, being applied to the screen grid of the modulator tube, biases this tube to cutoff. When the modulating pulse 3 is again applied to the control grid of tube 11, the circuit resumes its former status and the modulator tube again conducts.

The tubes 10 and 11 may be of any convenient known kind, but for the sake of simplicity they are shown as triodes.

The invention is of value in connection with pulse modulating the screen grid of a modulator power amplifier tube of a transmitter and is illustrated and described as applied to such a system by way of exemplification of the invention, but not in limitation thereof. It will, therefore, be apparent that while the invention is shown and described in a particular application, many changes and modifications may be made without departing from the spirit of the invention as sought to be defined in the following claim.

What is claimed is:

A pulse-translating circuit for a capacitive load comprising first and second electron tubes each having at least cathode, anode, and control electrodes, means for applying space-current potential between the anode of the first tube and the cathode of the second tube, a resistor connected between the cathode of the first tube and the anode of the second tube, a circuit independent of said capacitive load and said first tube for applying space-current potential between the anode and cathode of said second tube, said circuit comprising an impedance in series with said resistor, means normally biasing said second tube so that it is conducting, means connecting the control electrode of said first tube to a point on said resistor to maintain said first tube normally biased to cutoff while said second tube is conducting, a control circuit adapted to be coupled to a pulse source, means connecting said control circuit to the control electrode of said second tube for driving said second tube to space-current cutoff during the occurrence of each pulse from said source, whereby the cutoff bias on said first tube is removed, and means independent of said second tube for connecting said control circuit to the control electrode of said first tube to simultaneously render said first tube highly conducting during the occurrence of each pulse from said source, and means coupling said capacitative load between the cathode of said second tube and a point between the cathode of said first tube and the anode of said second tube.

LEROY S. HUTSON.

REFERENCES CITED

The following references are of record in the file of this patent:

UNITED STATES PATENTS

| Number | Name | Date |
|---|---|---|
| 2,310,342 | Artzt | Feb. 9, 1942 |
| 2,329,073 | Mitchell | Sept. 7, 1943 |
| 2,434,904 | Busignies | Jan. 27, 1948 |
| 2,438,960 | Blitz | Apr. 6, 1948 |
| 2,488,567 | Stodola | Nov. 22, 1949 |
| 2,509,269 | Hana | May 30, 1950 |
| 2,516,356 | Tull | July 25, 1950 |
| 2,567,239 | Sherertz | Sept. 11, 1951 |